United States Patent [19]
Lee

[11] Patent Number: 5,422,759
[45] Date of Patent: Jun. 6, 1995

[54] DOWNWARD VIEWING OPTICAL DEVICE

[76] Inventor: John Lee, 345 Edythe Ave., Livermore, Calif. 94550

[21] Appl. No.: 992,329

[22] Filed: Dec. 21, 1992

[51] Int. Cl.[6] ............................................. G02B 7/18
[52] U.S. Cl. ................................ 359/857; 359/840; 359/856; 359/860; 359/862; 359/871; 359/876
[58] Field of Search ............... 359/857, 855, 856, 860, 359/876, 849, 850, 862, 865, 871, 872, 879, 880

[56] References Cited
U.S. PATENT DOCUMENTS 3,019,689 2/1962 Paulsrud .................. 359/857
4,679,916 7/1987 Roller ....................... 350/623

FOREIGN PATENT DOCUMENTS 0241921 6/1926 United Kingdom ............... 359/857

Primary Examiner—Joseph A. Popek
Assistant Examiner—Huan Hoang

[57] ABSTRACT

An optical viewing apparatus adapted to be worn on the face which enables the wearer to view directly downward while maintaining an erect head and a horizontal line of sight.

15 Claims, 3 Drawing Sheets

DOWNWARD VIEWING OPTICAL DEVICE

BACKGROUND OF THE INVENTION

Many work environments require workers to look down on a table or desk top for long periods. In order to look down the head must tilt forward. When forward, the weight of the head is no longer balanced on top of the shoulders the muscles and vertebra must hold it up. This causes fatigue of the muscles and vertebra of the neck and shoulders. This neck fatigue has been the cause of numerous sick days and doctor visits with complaints of neck pain, muscle spasm, and headache to name a few.

Even while relaxing, the neck is often held in a position that can bring on fatigue. When sitting in certain types of chairs to read or watch television the neck muscles and vertebra are often being stretched. The longer the activity the greater the strain, and hence, pain. Furthermore, over long periods of time the muscles and vertebra of the neck adjust to being bent and a perminant stoop is developed.

The optical viewing device to be described will enable the viewer to maintain a head erect, horizontal line of sight while the vision is directed vertically down. Or while laying down on the back looking up one may have their vision directed horizontally towards the feet, perhaps at a television or a book on the lap.

BRIEF SUMMARY OF THE INVENTION

This invention is designed to reflect the line of sight down while holding the head in the upright erect position. Two mirrors are employed. The first closer to the face and just under the horizontal line of sight. The second further from the face and above the horizontal line of sight.

If only one mirror was used the image would be upside down and backwards. So two mirrors are needed to make the reflected image appear normal, and words readable.

For a greater understanding of the nature and features of the invention, reference should be had to the following detailed description taken in conjunction with the accompanying drawings.

DETAILED DESCRIPTION OF THE INVENTION

The present invention provides an optical viewing apparatus which will enable a person's neck and head to be straight and upright while reading a book at waist level on the table top. This will greatly reduce the amount of muscle fatigue in the neck and related complications.

Figure 1:
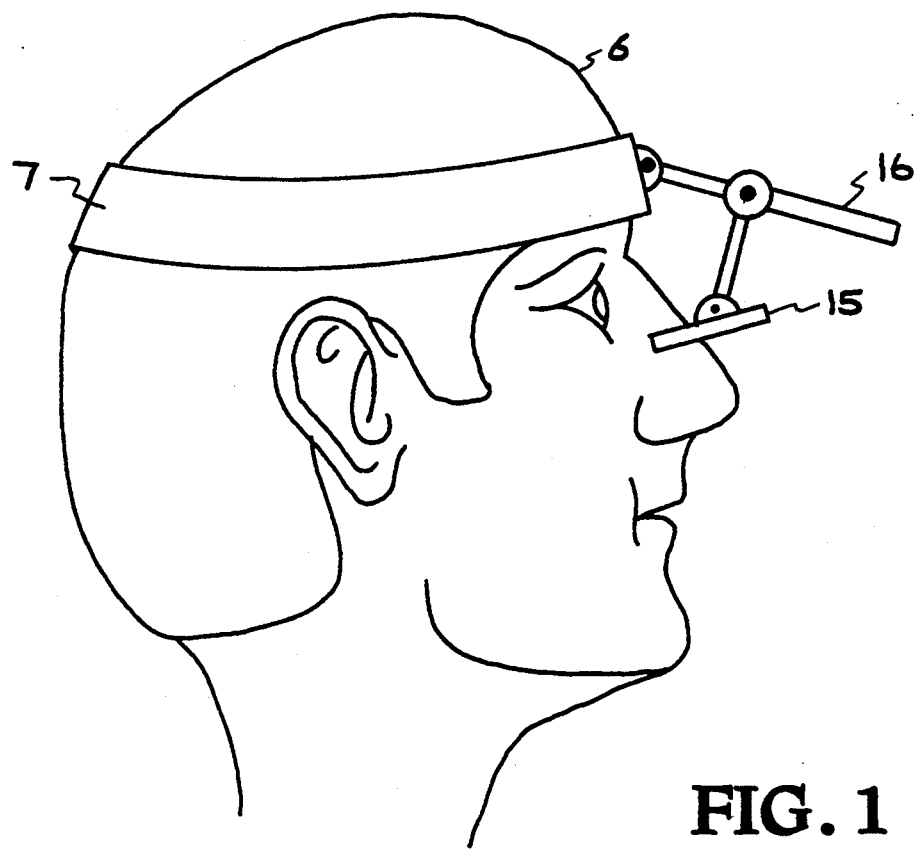
FIG. 1 illustrates a person wearing a headband on which is attached the optical viewing apparatus described.

Looking to FIG. 1, a person 6 is wearing a headband 7 with mirrors 15 and 16 attached so as to be in front of the eyes. The mirrors are made of thin glass approximately ⅛ inch thick. The glass is coated with a Cromium Cobalt coating or similar to give it a mirror surface. This mirror is on the first surface of the glass not the back surface as most house hold mirrors are. This first surface mirror prevents shadows from clouding the visual image. First surface mirrors can also be made from plexiglass. Details of the construction of the optical viewing apparatus may be seen by referring to FIGS. 2-4.

Figure 3:
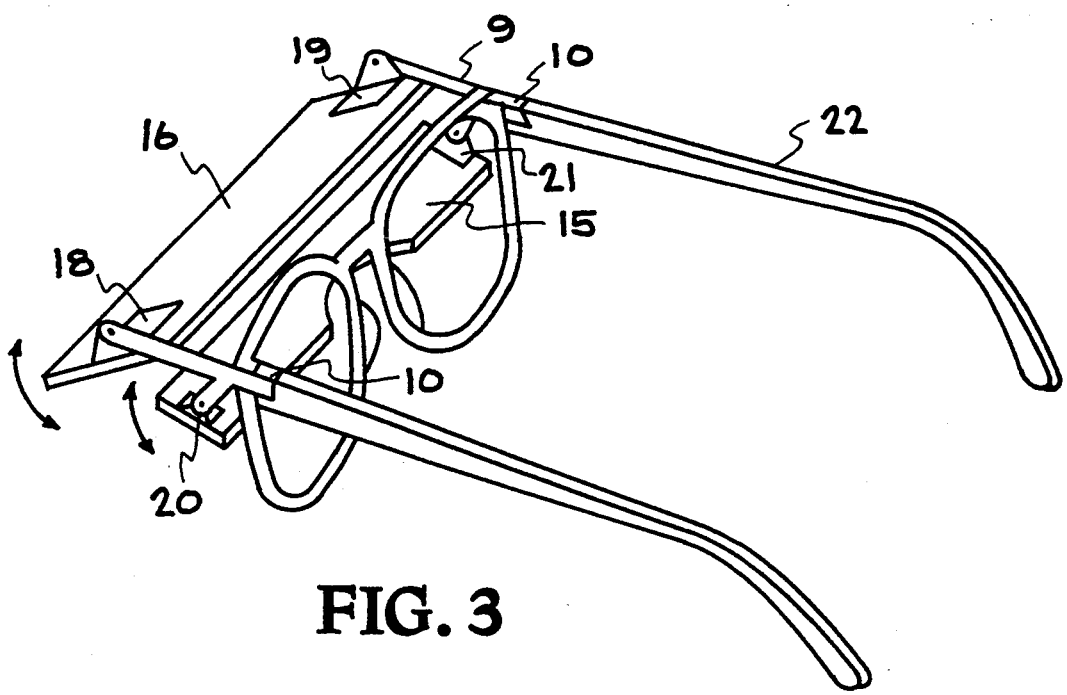
FIG. 3 is a top plane view of the optical viewing apparatus attached to glasses.
Figure 4:
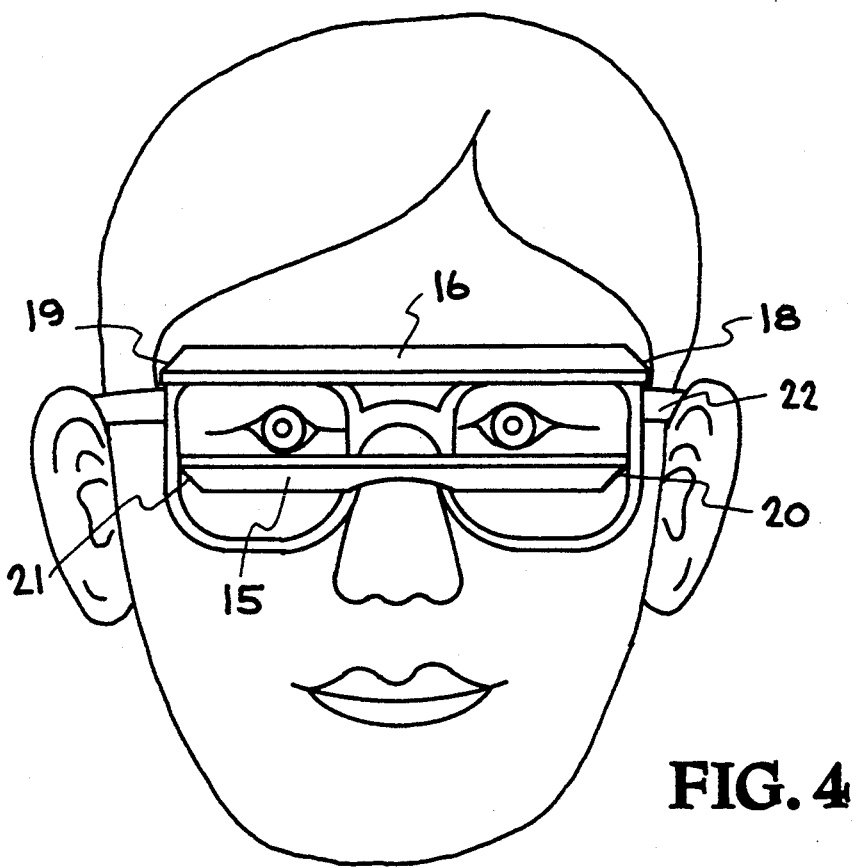
FIG. 4 is a front on view of the optical viewing apparatus attached to glasses being worn on a persons face.
Figure 6:
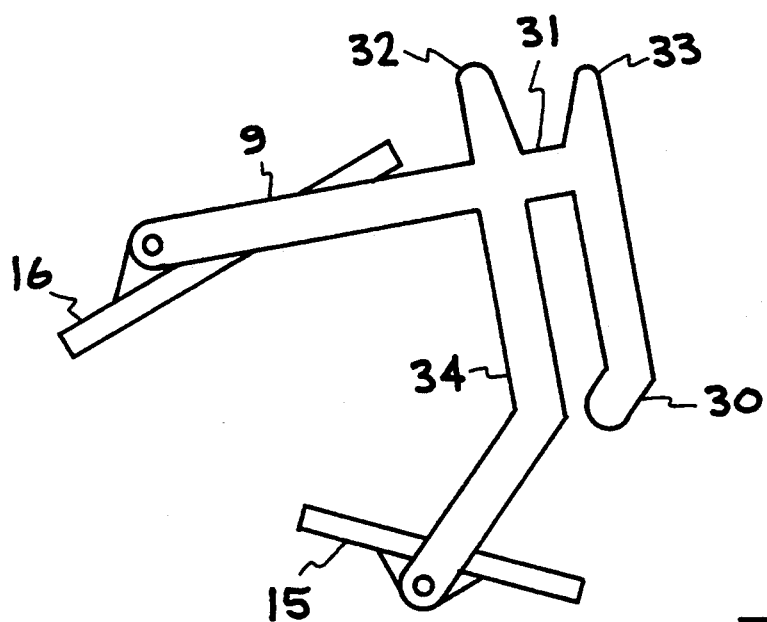
FIG. 6 shows a side view of the frame holding the mirrors which attaches to glasses in a removable manner.

In FIG. 3 the optical viewing apparatus includes a frame 9 which mounts a pair of rectangular mirrors 15 and 16. The frame 9 can be mounted to a pair of glasses 22 in a removable fashion by clipping them to the frame as shown at 10. In FIG. 6, 31 is a bridge of polypropylene that is flexible yet has memory. Hence 31 is like a hinge allowing arm 30 to be flexed one quarter of an inch, and when flexed maintains a pressure which allows frame 9 to hold on to glasses. Frame 9 in FIG. 6 clips over glasses with arm 30 being on the inside of the glasses and arm 34 being on the outside of the glasses as seen in FIG. 3. The frame 9 may be made of injection molded polyproplene for its light weight and strength.

Figure 5:
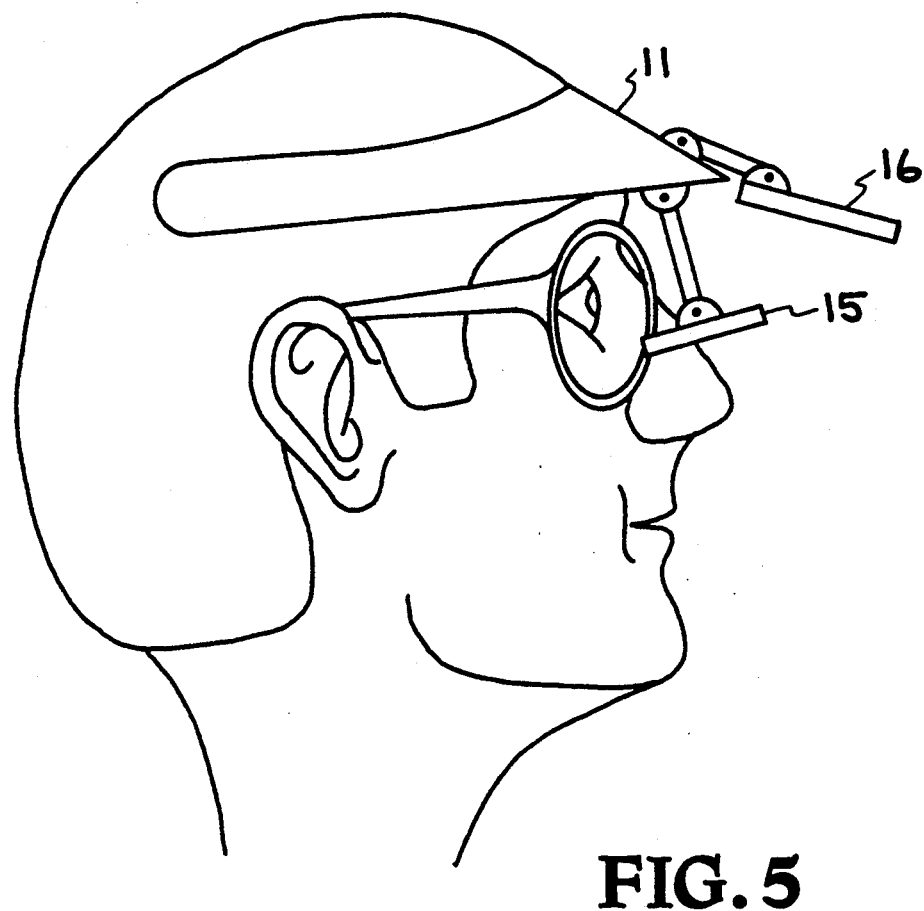
FIG. 5 shows the optical viewing apparatus attached to a visor while wearing glasses.

In FIG. 5 the mirrors 15 and 16 are mounted to the underside of a visor, 11.

Figure 2:
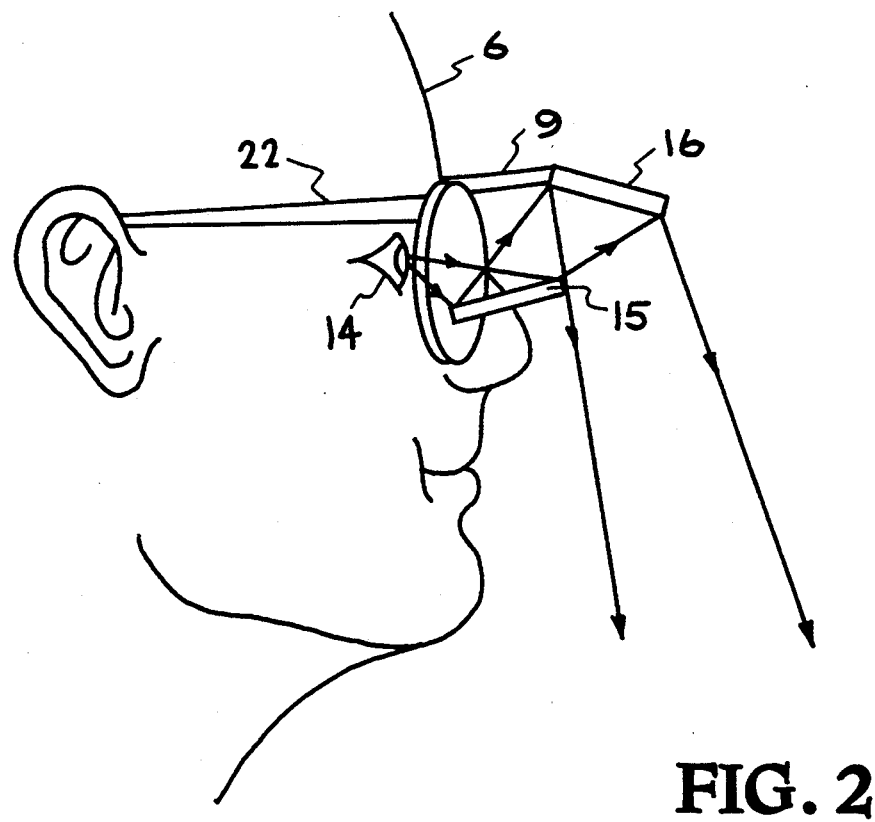
FIG. 2 is a side view of the persons head in phantom looking through the optical viewing apparatus, of the present invention, which is attached to glasses.

FIG. 2 is a view of the head of person 6. The persons eye 14 is looking ahead but slightly down into the mirror 15. Then the line of sight, shown with a dotted line, will reflect off mirror 15 up to mirror 16 which will again reflect the line of sight this time downward. This would enable a person to read from off the table top while keeping the head erect.

In FIG. 3 the frame 9 which holds the mirrors 15 and 16 allows adjustment of the mirrors in a rotating manner at the attachment points 18 and 19, and 20, 21. Adjustment is possible because frame 9 has a round male projection on the end of each arm that fits into a female depression made by injection molding which is mounted to each end of mirrors 15, 16. This would allow adjustment of the mirrors 15 and 16 to provide different line of sight angles over a 45 degree angle. That way the eye 14 could look straight ahead into mirror 15, or may look down forty five degrees into mirror 15. This would provide different fields of view and a personal comfort adjustment.

While a particular embodiment of the mirrors 15-16 and the frame 9 have been illustrated and described such is not intended to limit the scope of this invention. Modifications and changes will become apparent and the scope of the invention is to be limited only by the appended claims.

We claim:

1. An optical viewing apparatus adapted to be worn on the head of a wearer which comprises:
    a frame adapted to be worn about a wearer's head and eyes;
    a first mirror and a second mirror both of which are mounted to said frame in a spaced apart relationship, wherein said first mirror is positioned not higher than the horizontal line of sight, closer to a wearer's face than said second mirror, and vertically lower than said second mirror, said mirrors being oriented such that the wearer can view objects vertically below and in front of the wearer when the neck is straight and the head is erect and the line of sight is horizontal; and said frame and said mirrors being provided with means for adjusting said mirrors to provide different line of sight angles.

2. The optical viewing apparatus of claim 1 in which said first mirror is positioned below the horizontal line of sight.

3. The optical viewing apparatus of claim 1 in which said second mirror is spaced apart horizontally from said first mirror when the head of said wearer is in a vertical upright position.

4. The optical viewing apparatus of claim 1, wherein said frame includes clip-like means for removably mounting said frame on a pair of eye glasses.

5. The optical viewing apparatus of claim 1, wherein said first and second mirrors have a rectangular configuration.

6. An optical device comprising:
a support means,
a first mirror operatively mounted to said support means,
a second mirror operatively mounted to said support means,
said first mirror being mounted not higher than the horizontal line of sight,
said second mirror being mounted in a higher vertical and outer horizontal spaced relation with said first mirror, and
said support means and said mirrors being provided with means for adjusting a line of sight angle of each of said first and second mirrors.

7. The optical device of claim 6, wherein said support means comprises a mechanism adapted to be worn on a human head so that said mirrors are positioned to enable viewing in a substantially horizontal direction an object located vertically with respect to said mirrors.

8. The optical device of claim 6 wherein each of said first and second mirrors are of a rectangular configuration.

9. The optical device of claim 6, wherein said first mirror is mounted on said support means so as to be positioned closer to the eyes of a wearer of said support means than said second mirror, said mirrors being oriented such that objects located substantially vertically below a wearer of said support means can be viewed in a substantially vertical direction.

10. The optical device of claim 6, wherein said support means comprises a frame constructed to be removably mounted on a pair of eye glasses.

11. The optical device of claim 10, wherein said frame includes a flexible member for removably attaching the frame to a pair of eye glasses.

12. A method for viewing objects below and in front of a wearer with the head erect and neck straight with a horizontal line of sight which comprises the steps of:
placing an optical viewing apparatus on the head of a person about the eyes,
forming the apparatus comprising a frame adapted to be worn about the eyes and supporting a first mirror and a second mirror both of which are adjustably mounted to the frame in a spaced-apart relationship, such that the first mirror is positioned at or below the horizontal line of sight and closer to the face than the second mirror,
orienting the mirrors such that the wearer can view objects below the wearer in front of the feet when standing upright looking horizontally,
looking into the first mirror to view through the second mirror the object below and in front of the feet, and
forming the frame and the mirrors to provide different line of sight angles.

13. The method of claim 12 wherein the second mirror is spaced apart vertically from the first mirror, to enable the wearer to see between the mirrors.

14. The method of claim 12, additionally including the steps of forming the mirrors so as to have a rectangular configuration.

15. The method of claim 12, wherein the steps of forming the apparatus includes forming a clip-like means for removably attaching the frame to a pair of eye glasses.

* * * * *